(12) United States Patent
Schöllhorn

(10) Patent No.: US 7,762,558 B2
(45) Date of Patent: Jul. 27, 2010

(54) DEVICE FOR SEALING A ROTATING SHAFT PENETRATING A HOUSING WALL

(75) Inventor: Karl Schöllhorn, Birr (CH)

(73) Assignee: Sensoplan Aktiengesellschaft, Hohentengen (DE)

( * ) Notice: Subject to any disclaimer, the term of this patent is extended or adjusted under 35 U.S.C. 154(b) by 241 days.

(21) Appl. No.: 11/562,463

(22) Filed: Nov. 22, 2006

(65) Prior Publication Data

US 2007/0114728 A1 May 24, 2007

(30) Foreign Application Priority Data

Nov. 24, 2005 (DE) .................. 10 2005 055 942

(51) Int. Cl.
*F16J 15/40* (2006.01)

(52) U.S. Cl. .................. 277/400; 277/408; 277/431; 277/512

(58) Field of Classification Search ............. 277/400, 277/408, 430–432, 512, 513, 515, 516, 563
See application file for complete search history.

(56) References Cited

U.S. PATENT DOCUMENTS

| | | | | |
|---|---|---|---|---|
| 470,304 | A * | 3/1892 | Martin | 277/513 |
| 722,219 | A * | 3/1903 | Fielden | 277/514 |
| 833,961 | A * | 10/1906 | Guss | 277/507 |
| 1,109,826 | A * | 9/1914 | Doble | 277/513 |
| 1,431,101 | A * | 10/1922 | Dineen | 137/625.68 |
| 1,630,444 | A * | 5/1927 | McLaine et al. | 277/329 |
| 2,177,441 | A * | 10/1939 | Pesarese | 277/563 |
| 2,348,586 | A * | 5/1944 | Antonelli | 277/563 |
| 2,628,112 | A * | 2/1953 | Hebard | 277/506 |
| 2,674,474 | A * | 4/1954 | Lister | 166/84.2 |
| 3,047,299 | A * | 7/1962 | Karsten | 277/422 |
| 3,101,199 | A * | 8/1963 | Hartnagel | 277/511 |
| 3,119,623 | A * | 1/1964 | Shevchenko | 277/581 |
| 3,288,473 | A * | 11/1966 | Hinds | 277/515 |
| 3,675,935 | A * | 7/1972 | Ludwig et al. | 277/400 |
| 3,756,673 | A | 9/1973 | Strub | |
| 3,804,424 | A * | 4/1974 | Gardner | 277/360 |
| 3,871,666 | A * | 3/1975 | Franz et al. | 277/563 |
| 3,915,459 | A * | 10/1975 | Kunderman | 277/411 |
| 4,000,930 | A * | 1/1977 | Poncet et al. | 384/132 |
| 4,118,040 | A * | 10/1978 | Christ et al. | 277/432 |

(Continued)

FOREIGN PATENT DOCUMENTS

WO 89/09357 10/1989

*Primary Examiner*—Alison K Pickard
(74) *Attorney, Agent, or Firm*—Gudrun E. Huckett

(57) ABSTRACT

A device for sealing a rotating shaft that penetrates a stationary housing wall has a sealing ring fastened to the housing wall and arranged between the housing wall and a shaft. The sealing ring has sealing oil supply bores supplying sealing oil into a sealing gap formed between an inner wall surface of the sealing ring and an outer wall surface of the shaft. The inner wall surface has pocket-shaped recesses where the sealing oil supply bores open. The pocket-shaped recesses extend in the circumferential direction of the sealing ring. The inner wall of the sealing ring has at least one circumferential boundary stay that delimits and seals the pocket-shaped recesses in an axial direction of the sealing ring toward the first or second housing side. The inner wall surface of the sealing ring has a circumferential groove that connects the pocket-shaped recesses to one another.

16 Claims, 4 Drawing Sheets

U.S. PATENT DOCUMENTS

| | | | | |
|---|---|---|---|---|
| 4,222,575 A * | 9/1980 | Sekiguchi et al. | | 277/558 |
| 4,301,893 A * | 11/1981 | St. Jean et al. | | 277/516 |
| 4,486,024 A * | 12/1984 | Cooper | | 277/422 |
| 4,534,569 A * | 8/1985 | Ishitani et al. | | 277/351 |
| 4,552,369 A * | 11/1985 | Stewart et al. | | 277/513 |
| 4,579,349 A * | 4/1986 | Pipich et al. | | 277/422 |
| 4,600,317 A * | 7/1986 | Mori | | 384/117 |
| 4,602,873 A * | 7/1986 | Izumi et al. | | 384/99 |
| 4,647,050 A * | 3/1987 | Johnson | | 277/329 |
| 4,815,748 A * | 3/1989 | Schubert | | 277/422 |
| 4,877,257 A * | 10/1989 | Ide | | 277/466 |
| 5,368,313 A * | 11/1994 | Hudson | | 277/422 |
| 5,503,480 A * | 4/1996 | Caillaut et al. | | 384/477 |
| 5,509,664 A * | 4/1996 | Borkiewicz | | 277/543 |
| 5,516,118 A * | 5/1996 | Jones | | 277/400 |
| 5,558,341 A * | 9/1996 | McNickle et al. | | 277/400 |
| 5,642,892 A * | 7/1997 | Burgess | | 277/516 |
| 5,769,604 A * | 6/1998 | Gardner et al. | | 415/170.1 |
| 5,908,046 A * | 6/1999 | Mosman | | 137/312 |
| 6,145,843 A * | 11/2000 | Hwang | | 277/400 |
| 6,352,265 B1 * | 3/2002 | Ha | | 277/432 |
| 6,419,234 B1 * | 7/2002 | Yu | | 277/434 |
| 7,108,058 B2 * | 9/2006 | Pippert | | 166/84.4 |

* cited by examiner

DEVICE FOR SEALING A ROTATING SHAFT PENETRATING A HOUSING WALL

BACKGROUND OF THE INVENTION

The invention relates to a device for sealing a rotating shaft penetrating a stationary housing wall relative to the two housing sides. The device comprises a sealing ring arranged between the housing wall and the shaft and fixedly connected to the housing wall. The device also comprises means for supplying sealing oil into the sealing gap between the inner wall surface of the sealing ring and the outer wall surface of the shaft, wherein the sealing ring in its sealing surface in the area of the means for supplying sealing oil has pocket-shaped recesses extending in the circumferential direction. The pocket-shaped recesses of the sealing ring are closed off at least on one side of the sealing ring and sealed relative to the adjoining space of the correlated housing side by a circumferential boundary stay.

A special field of application of the invention are so-called turbo generators for generating electric energy. In turbo generators having great output, cooling is realized by means of hydrogen (or another type of gas) that is located within the generator housing. For this purpose, a gas-tight passage of the two shaft ends of the rotor through the generator housing is required in order to prevent escape of hydrogen relative to the two housing sides in the area of the rotating shaft.

The sealing of the shaft in the housing is realized by a shaft seal that is arranged fixedly in the housing and surrounds the rotating shaft. In this connection, by means of an appropriate sealing oil supply an oil film is maintained between the rotating shaft and the floating sealing ring that is stationary. For all operating states it is therefore required that the sealing oil as a barrier medium completely fills the sealing gap between the shaft and the sealing ring. Moreover, the axial gaps between the lateral surfaces of the sealing ring and the sealing ring housing in general are filled with sealing oil. This arrangement of the sealing ring and the shaft form a system that can oscillate because the oil film provides a spring-damper system.

However, for a completely centered ring with constant gap size, a self-centering action cannot be realized. This results in increased eccentricities of the sealing ring. This causes irregular heating, thermal buckling, increased hydrogen consumption, lower hydrogen purity as well as generally increased wear.

For this reason, there are self-centering sealing rings that essentially center themselves automatically in all operating states on the sealing oil film. This is achieved in that the sealing ring has about its inner wall surface several pocket-shaped recesses for the sealing oil. These pocket-shaped recesses have in the rotational direction of the shaft a wedge-shaped contour. The advantage of these pocket-shaped recesses in the sealing ring resides in that, at a reduced spacing between the shaft and the sealing ring, pressure builds in the pockets and, in turn, centers the sealing ring. This pressure generation is present also in the case of a centric ring.

The disadvantage of the sealing ring used in this sealing device resides in that the pocket-shaped recesses in the axial direction of the shaft are configured to be continuous, i.e., they extend from one side of the sealing ring to the other side of the sealing ring. In this way, viewed in the axial direction of the shaft, a continuous opening is formed. The result is that the effect of stabilization and self-centering cannot be completely realized.

U.S. Pat. No. 3,756,673 shows therefore a further developed device of the aforementioned kind for sealing and supporting a shaft penetrating a machine housing. In the embodiment according to FIG. 1 between the machine housing and the shaft a sealing bushing is arranged that is secured fixedly by means of a pin in the machine housing. The sealing bushing has at its inner circumference three sections. The two outer sections are provided for sealing relative to the high-pressure side and the low-pressure side, respectively, and the central section serves for radially guiding the sealing bushing relative to the shaft and for supporting the weight of shaft and rotor. The two outer sections rest seal-tightly against the shaft. The central section arranged therebetween, however, has wedge-shaped recesses for providing wedge-shaped hydrodynamic sliding films. They secure the sealing bushing strictly centrally relative to the shaft and prevent thus a metal contact in the two outer sealing sections. In the configuration of FIG. 2, the sealing bushing is laterally open in its central section. Therefore, a separate bushing is provided in this area.

U.S. Pat. No. 3,915,459 shows a sealing arrangement for a shaft that is rotatably supported in a housing. The seal has at its inner side an arc-shaped recess that is in communication with the oil supply by means of bores.

WO 89/09357 shows a so-called dry seal without oil lubrication for a rotating shaft. The seal is provided at its inner side with circumferential sealing chambers.

SUMMARY OF THE INVENTION

It is an object of the present invention to improve the sealing ring of a sealing device of the aforementioned kind in such a way that the sealing function and the carrying capacity of the sealing ring are improved.

In accordance with the present invention, this is achieved in that the pocket-shaped recesses are connected to one another about the inner circumference of the sealing ring by means of a circumferential groove formed within the sealing ring.

In this way, a sealing device with a special sealing ring is provided that is characterized by improved properties. For example, wear and oscillations are only minimal and the hydrogen consumption is reduced to a minimum. The basic idea of the sealing ring according to the invention resides in that the pocket-shaped recesses, viewed in the axial direction of the shaft, are not continuous but instead the pocket-shaped recesses have in the area of one sealing ring side or sealing ring plane a boundary wall. For laterally closing off the pocket-shaped recesses in the sealing ring a boundary stay is provided. The boundary stay is a concentric ring on one (flat) side of the sealing ring. The inner wall surface of the boundary wall of the pocket-shaped recess defines together with the outer wall surface of the shaft a wedge-shaped sealing gap in which the supplied sealing oil is located. In this connection, the sealing ring according to the invention has the advantage that no change in regard to the outer dimensions and no change of the nominal lubricant gap size are required. Moreover, a circumferential central groove at the center is provided primarily for generating two sealing wedges toward the air side and toward the hydrogen side. By means of this circumferential groove about the entire circumference of the sealing ring or the entire circumference of the shaft an oil film is provided in particular also at those locations where the sealing ring rests immediately against the shaft. In particular, the circumferential groove makes available a homogenous, uniformly distributed oil film for the pockets. Accordingly, with this circumferential central grove at the center together with the pockets, the complete sealing function and carrying capacity are ensured at all times. The center groove and the pocket-shaped recesses take over the complete sealing function and carrying capacity. The special characteristic of the sealing ring according to the invention is thus the configuration of the sealing surface of the shaft seal. As a whole, the wear is eliminated as well as side-swiping of the ring that leads to oscillations. As already mentioned supra, the hydrogen consumption can also be minimized and the hydrogen purity can be increased.

According to another embodiment, the sealing action is realized on that side of the pocket-shaped recesses where, relative to the oil pressure, the greater differential pressure is present. This has the advantage that leakage at this separation plane of the media is reduced to a minimum.

In a preferred embodiment, the pocket-shaped recesses of the sealing ring on both sides of the sealing ring are closed off and sealed relative to the shaft by means of boundary stays. In this embodiment, the pocket-shaped recesses are closed on both sides. This means that the cylindrical inner wall surface of the sealing ring is provided with the pocket-shaped recesses that are uniformly distributed essentially within a strip-shaped central area about the entire circumference. On either side of these pocket-shaped recesses the sealing ring has thus about the entire circumference the predetermined inner diameter of the sealing ring with a minimal sealing gap relative to the shaft.

According to a further embodiment, the sealing oil supply comprises supply bores to the pocket-shaped recesses that extend radially or axially or slantedly.

In a basic version, the sealing ring in accordance with another embodiment has about the inner circumference of the sealing ring a single sealing circle comprised of the circumferential groove with pocket-shaped recesses provided therein.

In an alternative embodiment, about the inner circumference of the sealing ring several coaxially spaced-apart circles of circumferential groove and pocket-shaped recesses are provided, i.e., several sealing circles are provided and spaced from one another coaxially. The circumferential grooves are coaxially spaced from one another and in these circumferential grooves the pocket-shaped recesses are formed. By providing several sealing circles, the sealing action of the sealing ring is improved.

In accordance with another embodiment, the pocket-shaped recesses of the neighboring sealing circles neighbor one another congruently and the sealing oil supply bores in the neighboring recesses of neighboring circles are either also neighboring one another congruently or are staggered relative to one another. In the case of neighboring circles, the pocket-shaped recesses are, on the one hand, identical and, on the other hand, neighboring one another congruently, i.e., the pocket-shaped recesses of the circles are accordingly positioned adjacent to one another. In this connection, the sealing oil supply bores can also open at the same locations into the recesses. However, they can also open in a staggered arrangement into the neighboring recesses.

Two embodiments of a device according to the invention for sealing a rotating shaft penetrating a stationary housing wall will be explained in the following with the aid of the drawings.

DESCRIPTION OF THE PREFERRED EMBODIMENTS

The illustrated embodiments concern a turbo generator in which the shaft 1 of the rotor penetrates a housing wall 2 and is rotatably supported therein. On one housing side of the housing wall 2 there is air (outside of the housing) and on the other housing side of the housing wall 2 there is hydrogen (in the interior of the housing).

Figure 1:
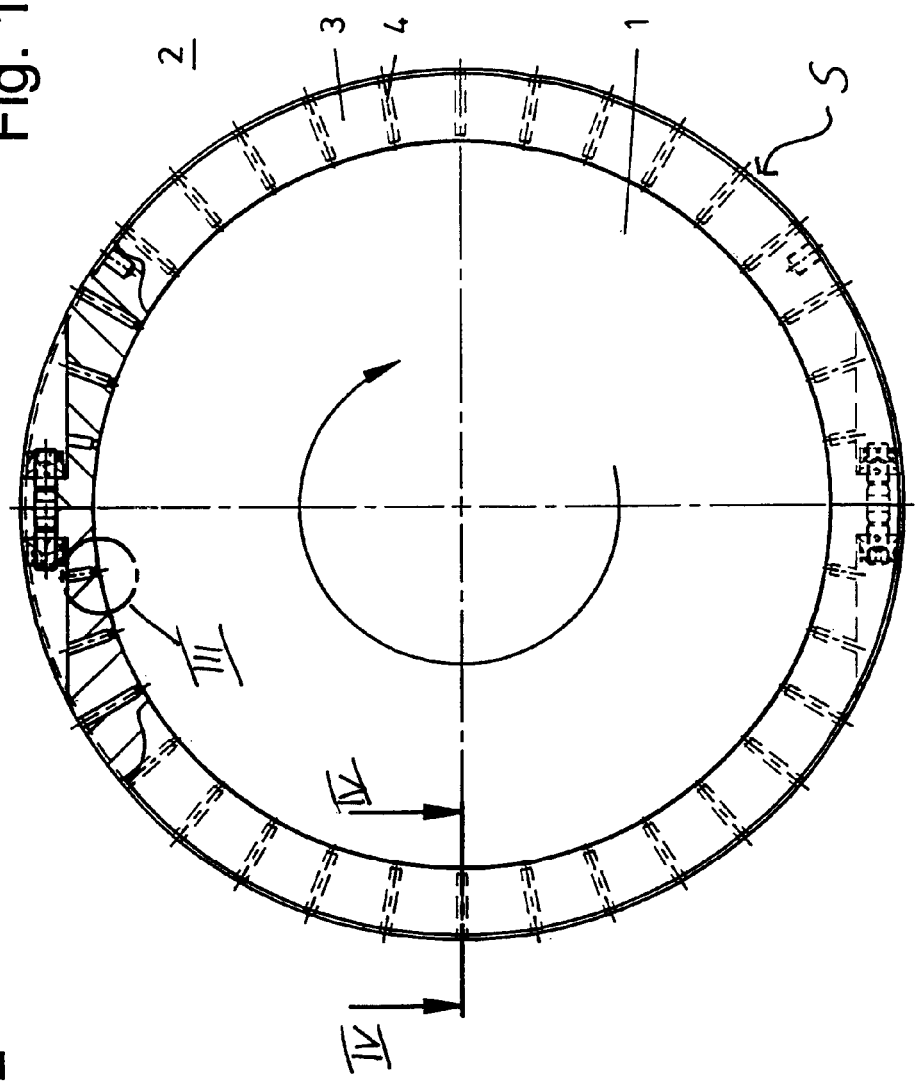
FIG. 1 is a view of the sealing device of a first embodiment in the axial direction of the shaft.
Figure 2:
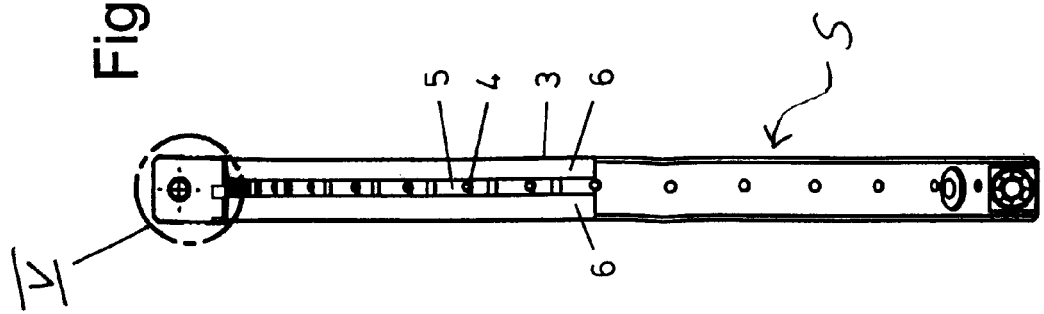
FIG. 2 is a view of the sealing ring of FIG. 1 perpendicularly to the central axis, wherein the upper half shows the inner wall surface of the sealing ring and the bottom half shows the outer wall surface of the sealing ring.
Figure 3:
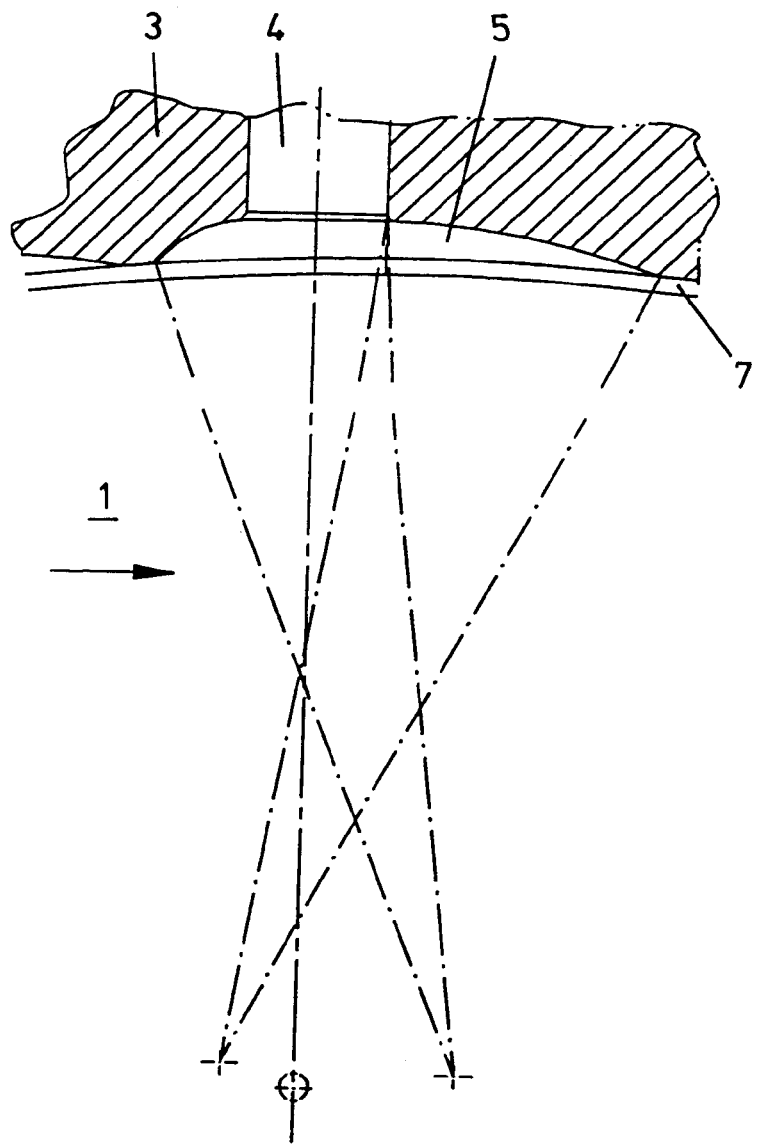
FIG. 3 is a detail view of the area III of the illustration of FIG. 1.
Figure 4:
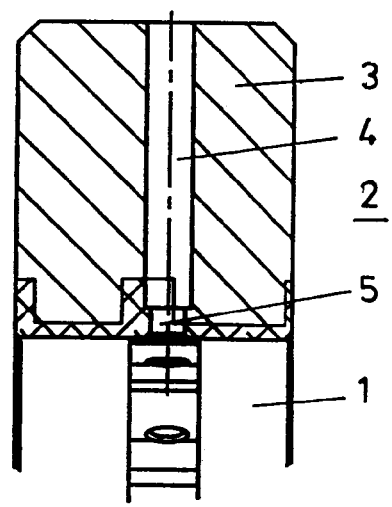
FIG. 4 is a section view along the section line IV-IV of FIG. 1 (rotated by 90 degrees).
Figure 5:
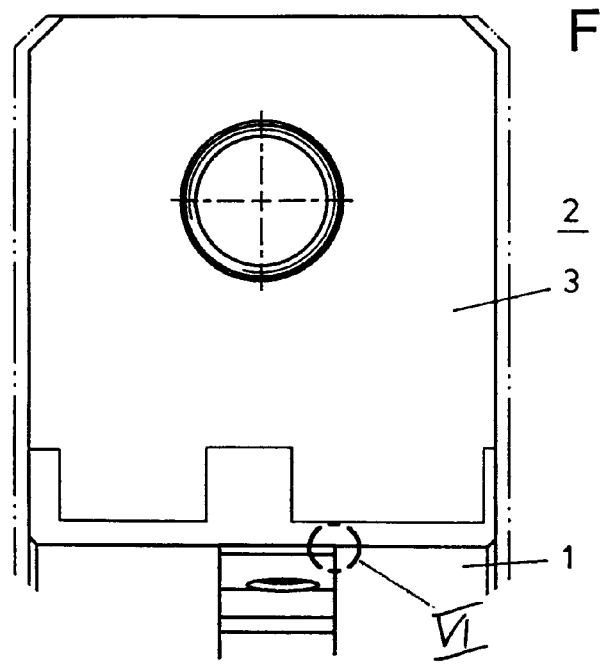
FIG. 5 is a detail view of the area V of the illustration of FIG. 2.
Figure 6:
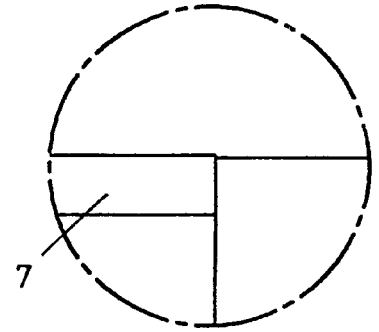
FIG. 6 is a detail view of the area VI of the illustration of FIG. 5 where the circumferential groove is located.
Figure 7:
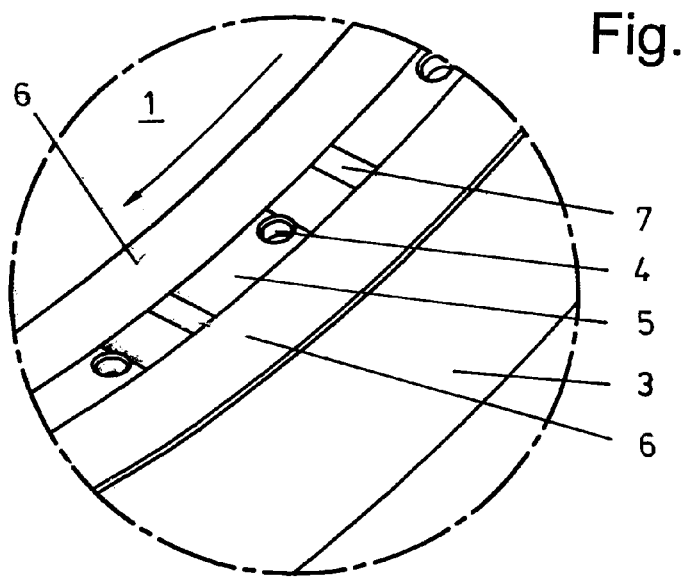
FIG. 7 is a perspective partial view of the inner wall surface of the sealing ring.

Between the housing wall 2 and the shaft 1 there is a seal S comprising a sealing ring 3 that is connected fixedly to the housing wall 2. The sealing ring 3 has several sealing oil supply bores 4 that extend radially and are distributed about the circumference of the sealing ring. They open radially at the inner side if the sealing ring inside a pocket-shaped recess 5, respectively. As shown in FIG. 3, this pocket-shaped recess 5 has such a profile that, viewed in the rotary direction of the shaft 1, it is wedge-shaped.

On both sides of the sealing ring 3, the pocket-shaped recesses 5 are delimited by a circumferentially extending boundary stay 6, respectively. These two circumferential boundary stays 6 are configured as hollow cylinders in the direction toward the shaft 1 and therefore form a uniform sealing gap together with the shaft 1. In the end, this means that the entire radial inner wall of the sealing ring 3 is of a hollow-cylindrical configuration and that in the central strip extending about the entire circumference pocket-shaped recesses 5 are formed that extend in the direction of the circumference of the sealing ring 3 and are spaced apart from one another.

Finally, the pocket-shaped recesses 5 are also connected at the center by a circumferentially extending circumferential groove 7 (see FIG. 3).

The device functions as follows:

Through the sealing oil supply bores 4 sealing oil is supplied to the sealing gap between the shaft 1 and the sealing ring 3; the sealing oil pressure is e.g. 4-5 bar. This sealing oil collects in the aforementioned sealing gap as well as in the pocket-shaped recesses 5 and also in the circumferential groove 7. Pressure is generated in the pocket-shaped recesses 5, respectively. In the case of an exact centric position of the sealing ring 3 the resultant is zero.

By means of the pocket-shaped recesses 5 the sealing ring 6 is self-centering. Should the sealing ring 3 assume an eccentric position relative to the shaft 1, a resultant is generated in the pocket-shaped recesses 5 that in turn centers the sealing ring 3 relative to the shaft 1.

By means of the lateral boundary stays 6 of the pocket-shaped recesses 5 advantages result with regard to wear, oscillations as well as hydrogen consumption and hydrogen purity. The circumferential groove 7 provides in this connection the pocket-shaped recesses 5 with a homogenous uniformly distributed oil film.

Figure 8:
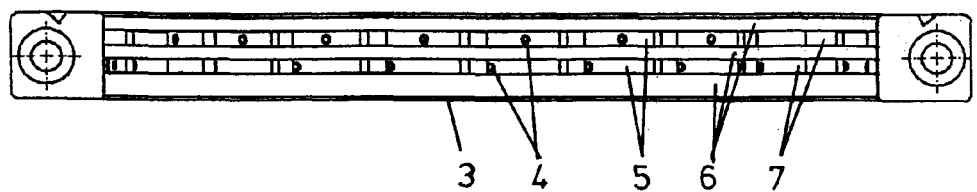
FIG. 8 shows a second embodiment with two sealing circles in a view of the inner wall surface of the sealing ring.
Figure 9:
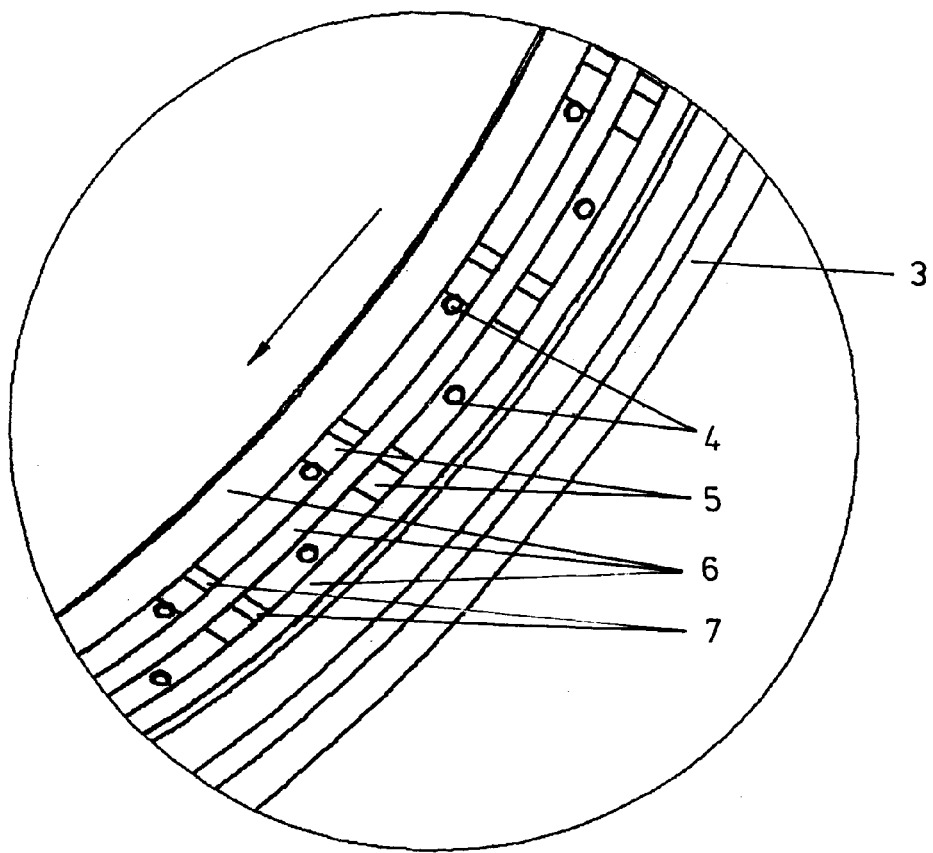
FIG. 9 is a perspective partial view of the inner wall surface of the sealing ring of the second embodiment of FIG. 8 in an illustration similar to FIG. 7.

The second embodiment according to FIGS. 8 and 9 differs from the first embodiment of FIGS. 1 through 7 in that two sealing circles are provided (same reference numerals indicate same parts). This means that on the inner wall surface of the sealing ring 3 there are two circumferential grooves 7 that are separated from one another by an intermediately positioned boundary stay 6. In the two circumferential grooves 7 pocket-shaped recesses 5 are provided, respectively. They are identical with regard to their shape and are positioned accordingly adjacent to one another. Only the sealing oil supply bores 4 that open into the pocket-shaped recesses 5 are staggered relative to one another in the neighboring sealing circles.

The specification incorporates by reference the entire disclosure of German priority document 10 2005 055 942.5 having a filing date of 24 Nov. 2005.

While specific embodiments of the invention have been shown and described in detail to illustrate the inventive principles, it will be understood that the invention may be embodied otherwise without departing from such principles.

What is claimed is:

1. A device for sealing a rotating shaft that penetrates a stationary housing wall; the device comprising:
    a seal comprising a sealing ring connected fixedly to a housing wall and arranged between the housing wall and a shaft, wherein a sealing gap is formed between an inner wall surface of the sealing ring and an outer wall surface of the shaft and wherein the sealing ring seals a first housing side relative to a second housing side of the housing wall;
    the sealing ring having sealing oil supply bores that supply sealing oil into the sealing gap;
    the inner wall surface of the sealing ring having a continuous circumferential groove, that is continuous in a circumferential direction of the sealing ring, and pocket-shaped recesses arranged within the continuous circumferential groove and recessed relative to a bottom of the continuous circumferential groove;
    wherein the pocket-shaped recesses have a first width in an axial direction of the sealing ring and wherein the continuous circumferential groove has a second width in the axial direction of the sealing ring, wherein the first and second widths are identical so that the pocket-shaped recesses are exclusively arranged within the continuous circumferential groove;
    wherein the sealing oil supply bores each open into one of the pocket-shaped recesses, wherein the pocket-shaped recesses extend in the circumferential direction of the sealing ring, wherein the pocket-shaped recesses each are wedge-shaped in a rotary direction of the shaft and are connected to one another in the circumferential direction by the continuous circumferential groove;
    the inner wall surface of the sealing ring having at least one circumferential boundary stay that delimits and seals the pocket-shaped recesses in the axial direction of the sealing ring toward one of the first and second housing sides.

2. The device according to claim 1, wherein a sealing action of the device is realized on a side of the pocket-shaped recesses where a greater oil pressure differential of the sealing oil is present.

3. The device according to claim 1, wherein two of said at least one circumferential boundary stay are provided and wherein the pocket-shaped recesses are delimited and sealed by the two of said at least one circumferential boundary stays relative to the shaft.

4. The device according to claim 1, wherein the sealing oil supply bores open into the pocket-shaped recesses radially or axially or slantedly.

5. The device according to claim 1, wherein the continuous circumferential groove and the pocket-shaped recesses form a sealing circle about an inner circumference of the sealing ring.

6. The device according to claim 5, wherein several of said sealing circle are provided on the inner wall surface of the sealing ring and are coaxially spaced apart from one another.

7. The device according to claim 6, wherein said several sealing circles are arranged such that the pocket-shaped recesses neighboring one another in the axial direction are congruent to one another and wherein the sealing oil supply bores of the pocket shaped recesses neighboring one another in the axial direction are congruent or staggered relative to one another.

8. The device according to claim 1, wherein the pocket-shaped recesses impart a self-centering action to the sealing ring by generating a resultant of sealing oil pressure in the pocket-shaped recesses which resultant centers the sealing ring.

9. A seal for a device for sealing a rotating shaft that penetrates a stationery housing wall, wherein the seal is connected fixedly to a housing wall and arranged between the housing wall and a shaft; the seal comprising:
    a sealing ring having an inner wall surface, wherein a sealing gap is formed between the inner wall surface and an outer wall surface of a shaft;
    the sealing ring having sealing oil supply bores that supply sealing oil into the sealing gap;
    the inner wall surface having a continuous circumferential groove, that is continuous in a circumferential direction of the sealing ring, and pocket-shaped recesses arranged within the continuous circumferential groove and recessed relative to a bottom of the continuous circumferential groove;
    wherein the pocket-shaped recesses have a first width in an axial direction of the sealing ring and wherein the continuous circumferential groove has a second width in the axial direction of the sealing ring, wherein the first and second widths are identical so that the pocket-shaped recesses are exclusively arranged within the continuous circumferential groove;
    wherein the sealing oil supply bores each open into one of the pocket-shaped recesses, wherein the pocket-shaped recesses extend in the circumferential direction of the sealing ring, wherein the pocket-shaped recesses each are wedge-shaped in a rotary direction of the shaft and are connected to one another in the circumferential direction by the continuous circumferential groove;
    the inner wall surface of the sealing ring having at least one circumferential boundary stay that delimits the pocket-shaped recesses in the axial direction of the sealing ring.

10. The seal according to claim 9, wherein a sealing action is realized on a side of the pocket-shaped recesses where a greater oil pressure differential of the sealing oil is present.

11. The seal according to claim 9, wherein two of said at least one circumferential boundary stay are provided and wherein the pocket-shaped recesses are delimited and sealed by the two of said at least one circumferential boundary stays relative to a shaft.

12. The seal according to claim 9, wherein the sealing oil supply bores open into the pocket-shaped recesses radially or axially or slantedly.

13. The seal according to claim 9, wherein the circumferential groove and the pocket-shaped recesses form a sealing circle about an inner circumference of the sealing ring.

14. The seal according to claim 13, wherein several of said sealing circle are provided on the inner wall surface of the sealing ring and are coaxially spaced apart from one another.

15. The seal according to claim 14, wherein said several sealing circles are arranged such that the pocket-shaped recesses neighboring one another in the axial direction are congruent to one another and wherein the sealing oil supply bores of the pocket shaped recesses neighboring one another in the axial direction are congruent or staggered relative to one another.

16. The seal according to claim 9, wherein the pocket-shaped recesses impart a self-centering action to the sealing ring by generating a resultant of sealing oil pressure in the pocket-shaped recesses which resultant centers the sealing ring.

* * * * *